(12) United States Patent
Richter et al.

(10) Patent No.: US 9,870,687 B1
(45) Date of Patent: Jan. 16, 2018

(54) SYSTEM FOR INTERACTING WITH A CONTAINER AND THE RELATED CONTENT PLACED NEAR A CONDUCTING SURFACE

(71) Applicants: Wolfgang Richter, Vancouver (CA); Faranak Zadeh, Vancouver (CA)

(72) Inventors: Wolfgang Richter, Vancouver (CA); Faranak Zadeh, Vancouver (CA)

(73) Assignee: EPIC SEMICONDUCTORS INC, Vancouver, BC ( * ) Notice: Subject to any disclaimer, the term of this patent is extended or adjusted under 35 U.S.C. 154(b) by 37 days.

(21) Appl. No.: 15/246,124

(22) Filed: Aug. 24, 2016

(51) Int. Cl.
| | |
|---|---|
| G08B 1/08 | (2006.01) |
| G08B 13/26 | (2006.01) |
| G08B 13/196 | (2006.01) |
| H04Q 9/00 | (2006.01) |
| H04L 29/06 | (2006.01) |

(52) U.S. Cl.
CPC ....... *G08B 13/26* (2013.01); *G08B 13/19695* (2013.01); *H04Q 9/00* (2013.01); *H04L 67/42* (2013.01); *H04Q 2209/40* (2013.01)

(58) Field of Classification Search
CPC .... G08B 13/26; G08B 13/19695; H04Q 9/00; H04Q 2209/40; H04L 67/42
USPC .................................................... 340/539.25
See application file for complete search history.

(56) References Cited

U.S. PATENT DOCUMENTS

| 5,642,268 A | * | 6/1997 | Pratt | H05B 6/666 |
| | | | | 315/106 |
| 9,369,824 B2 | * | 6/2016 | Richter | G06Q 30/0241 |
| 9,509,178 B2 | * | 11/2016 | Richter | H02J 3/00 |

(Continued)

*Primary Examiner* — Eric M Blount

(57) ABSTRACT

Disclosed is a system for interacting with one or more containers placed near a conducting surface. The system sends the information of content inside the container in relation to an action caused by a user over the communication network. The system includes a controller; a frequency generator; a first electrode; an electronic circuitry including a convertor, an e-filed strength meter, an I/O interface and a bi-directional communication unit; a second electrode and a media unit. The controller generates a unique identification code for each container. The controller communicates through the communication network. The frequency generator provides a modulated alternating electric with variable frequency. The first electrode floats in the air inside the container and mirrors charges received from the frequency generator through the conducting surface and the content. The convertor converts alternating charges into DC energy received from the first electrode. The e-filed strength meter measures changes in the alternating charges on the container. The I/O interface generates input and output signals on receiving the change in the alternating charges from e-field strength meter and the bi-directional communication unit to communicate the changes in the electric field strength from the e-field strength meter to the controller. The second electrode is coupled to the converter and is attached to the cap of the container and further floats against the ground. The media unit stores and communicates media data related to the container over the communication network on receiving the field strength signal along with the unique ID number from the controller.

12 Claims, 1 Drawing Sheet

(56) References Cited

U.S. PATENT DOCUMENTS

2005/0162411 A1* 7/2005 Berkel van ......... G06F 3/03545
345/179
2012/0112828 A1* 5/2012 Richter .................. H02J 50/05
327/564

* cited by examiner

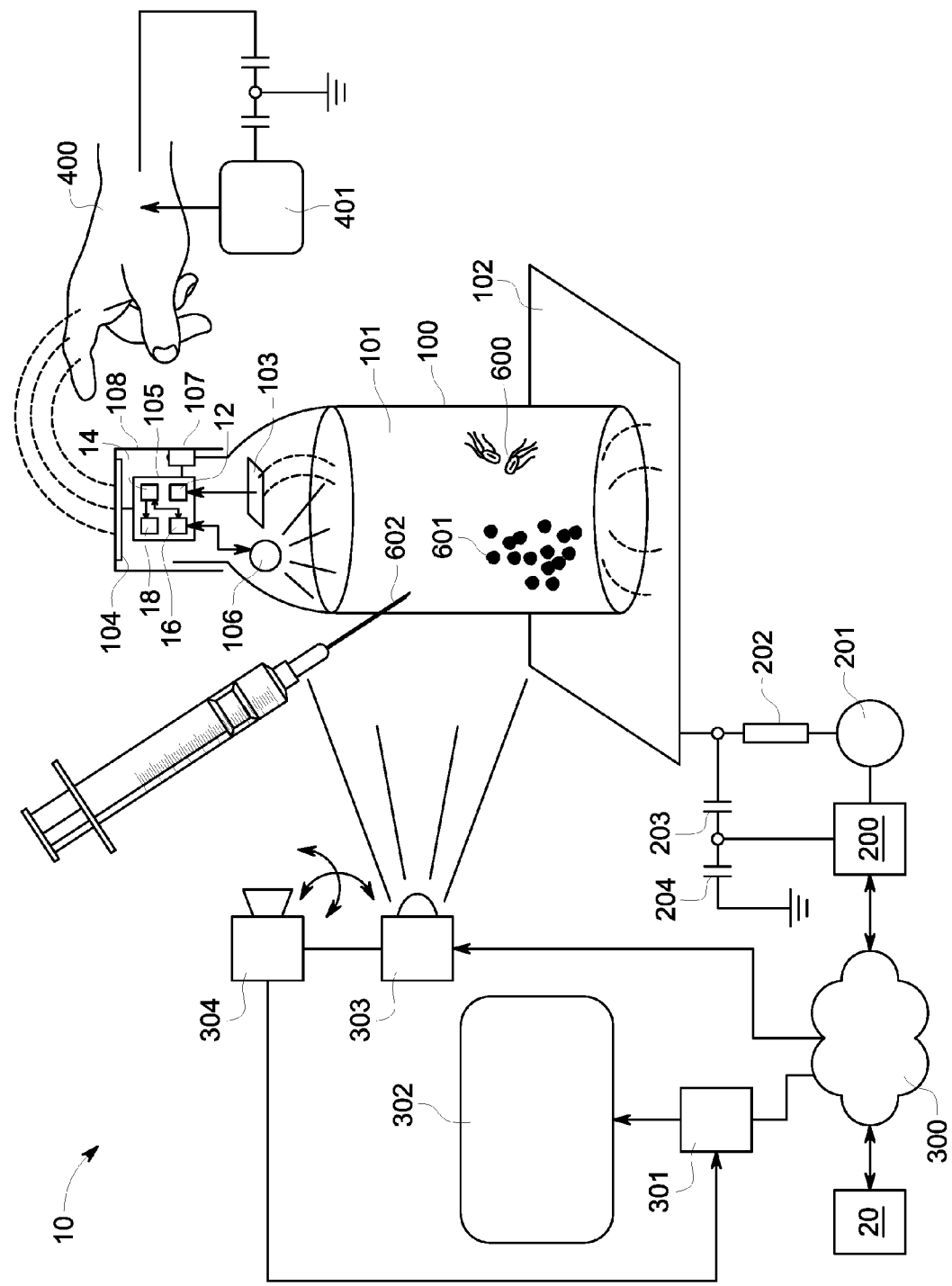

SYSTEM FOR INTERACTING WITH A CONTAINER AND THE RELATED CONTENT PLACED NEAR A CONDUCTING SURFACE

BACKGROUND OF THE INVENTION

1. Field of the Invention

The present invention generally relates to a system for interacting with a container and its packaging illumination, and more particularly relates to a system for interacting with a container and its content placed near a conducting surface. Further, the content related information is displayed through a media unit. Further, the system sends the information to a communication device of a user.

2. Description of Related Art

The variety of products presented in shops is counterproductive for consumers to focus on items of their special need. On the other side all products want to have the attention of consumers to get bought. The packaging industry provides colorful containers (packages) which promise contents of value as a visual impression. For additional information, digital signage is placed on electronic displays (screens) on many places at the point of sale (POS). Often repeated and mostly annoying advertising clips are constantly running to seduce consumers and prepare messages for the subconscious to create desire for advertised products.

A special way to intense the relation between the consumer and the product is so-called "self-scanning". Since the upcoming of bar codes retailers tried to involve consumers and sell more if they let them scan the products to get more information or more attractive pricing. It never worked well, neither with the later upcoming infrared PDA's (IRDA) nor with the latest near field technologies (NFC).

Consumers don't scan the products at POS for buying them, but rather take the chance to use their smart devices for getting similar products somewhere else cheaper; they just compare. RFID is an electronic logistic element which comes on patches or stickers to make logistic and product safety easier and more affordable for the retailers, but it failed to serve consumers. RFIDs are easy to temper which, which is proven in the increasing number of shoplifting delicts.

Therefore, there is a need of a system for interacting with one or more containers i.e. battery free energy harvesting, contactless sensing and wireless (non-magnetic communication features). Further, the system should be able to attract consumers, prevent shoplifting and share media data over the communication network.

SUMMARY OF THE INVENTION

In accordance with teachings of the present invention, a system for interacting with one or more containers placed near a conducting surface is provided. The system sends the information of content inside the container in relation to an action caused by a user over the communication network. Typical containers are bottles form glass or plastic (e.g. blister), boxes, flexible packages, cans, etc. Typical content are beverages, liquids, chemicals, food, cosmetics, snacks etc.

An object of the present invention is to provide the system with a controller; a frequency generator; a first electrode; an electronic circuitry including a convertor, an e-field strength meter, an I/O interface and a bi-directional communication unit; a second electrode and a media unit.

The controller generates a unique identification code for each container. The controller communicates through the communication network. The frequency generator provides a modulated alternating electric field with variable frequency. The conductive surface is connected to the frequency generator and further facilitates the charges from the electric field to couple with other surfaces (electrodes) in reach.

The first electrode floats in the space/air inside the container and mirrors charges received from the frequency generator through the conducting surface and the content of the container. The electronic circuitry is configured to attach with the container and further couples to the first electrode. The convertor converts alternating charges into DC energy received from the first electrode. The e-field strength meter measures changes in the alternating charges on the container.

The I/O interface generates input and output signals on receiving the change in the alternating charges from e-field strength meter and the bi-directional communication unit to communicate the changes in the electric field strength from the e-field strength meter to the controller. The bi-directional communication unit communicates over the e-field with the controller.

The second electrode is coupled to the converter and is attached to the cap of the container and further floats against the ground. Therefore, the closed circuitry becomes sensitive because the floating ground conditions change the e-field strength/impedance if the user approaches. The user's skin (dermis) is used as a capacitive coupling surface, which couples better against ground than air.

The media unit stores and communicates media data related to the container over the communication network on receiving the field strength signal along with the unique ID number from the controller. Further, the controller transmits the field strength signal (as a digital value) to the media unit over the communication network on receiving field strength signal from the bi-directional communication unit.

Further, the e-field strength meter also measures changes in the field strength in real time caused due to infestation/contamination in the content of the container. Furthermore, the media unit communicates media data related to the container to a communication device of the user through the communication network.

Another aspect of the present invention is to provide the system with a movable camera for receiving signal from the media unit through the communication network for capturing images of the user causing changes in the field strength near the container. The camera is moveable in all possible directions such as X, Y, and Z. Further, the system includes a light source that is connected to the electronic circuitry attached to the container for illuminating the contents or parts of the container on receiving signals from the I/O interface.

Another aspect of the present invention, the system further includes a sealed switch which activates on the removal of the cap from the container and communicates the status to the bi-directional communication unit. Further, the system includes a display unit for receiving signal from the media unit through the communication network for displaying media data or information to the user. The media unit receives the ID and e-field strength signal of the user approached container from the controller.

Another aspect of the present invention, the system includes a first capacitor for filtering the generated alternating charges, a second capacitor for forking in or out modulation in the generated alternating charges, and impedance for creating a resonance filter (e.g. LC) with the first capacitor and the second capacitor. The controller communicates data to the bi-directional communication unit through the fork between the first capacitor and the second capacitor.

Another aspect of the invention is to provide the system with a X,Y,Z movable light for projecting light spots on the container on receiving signal from the media unit. The media unit receives signal from the controller. Further, the system includes a cloud server to store media information about the container and the user data. The cloud server communicates data to the communication device of the user and the media unit.

Another aspect of the invention is to provide the system with an identification device carried by the user. The identification device modulates a user ID over the second electrode into the bi-directional communication unit. The controller processes the user ID received from the bi-directional communication unit to identify the user.

These and other features and advantages will become apparent from the following detailed description of illustrative embodiments thereof, which is to be read in connection with the accompanying drawings.

BRIEF DESCRIPTION OF DRAWINGS

FIG. 1 illustrates a schematic diagram of a system for interacting with one or more containers placed near a conducting surface, in accordance with a preferred embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF DRAWINGS

While this technology is illustrated and described in a preferred embodiment, a system for interacting with one or more containers placed near a conducting surface may be produced in many different configurations, forms and materials. There is depicted in the drawings, and will herein be described in detail, as a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the technology described herein.

Reference will now be made in detail to several embodiments of the invention which are illustrated in the accompanying drawings. Wherever feasible and convenient, the same reference numerals are used in the figures and the description to refer to the same or like parts. The drawings are in a simplified form and not to precise scale. For purposes of convenience and clarity only, directional terms, such as top, bottom, left, right, up, down, over, above, below, beneath, rear, and front may be used with respect to the accompanying drawings.

These and similar directional terms should not be strictly construed to limit the scope of the invention. In addition, words such as attached, affixed, coupled, connected and similar terms with their inflectional morphemes are used interchangeably, unless the difference is noted or made otherwise clear from the context. These words and expressions do not necessarily signify direct connections, but include connections through mediate components and devices.

In a preferred embodiment of the present invention, the system interacts with one or more containers. However, for the exemplary purposes the invention is explained hereinafter with reference to FIG. 1 where the system interacts with one container. It would be readily apparent to those skilled in the art that the system may interact with multiple containers without deviating from the scope of the present invention.

FIG. 1 illustrates a schematic diagram of a system 10 for interacting with the container 100 placed near a conducting surface 102 in accordance with a preferred embodiment of the present invention. The system 10 sends the information of content 101 inside the container 100 in relation to an action caused by a user 400 over the communication network 300. In a preferred embodiment, the conducting surface 102 is an adhesive tape (made of material including but not limited to metal, carbon, grapheme, anti-static rubber, polymer etc) applied on any surface (shelf, board, floor etc) to emit the alternating electric field.

The system 10 includes a controller 200, a frequency generator 201, a first electrode 103, an electronic circuitry 105, a second electrode 104, and a media unit 301 in a preferred embodiment of the present invention. The controller 200 generates a unique identification code for the container 100, wherein the controller 200 communicates through the communication network 300. Examples of controller 200 include but not limited to microcontroller, system on chip (SOC), FPGA, state machines etc.

The frequency generator 201 provides a modulated alternating electric field with variable frequency. The frequency generator 201 generates variable frequency of e.g. 100 kHz. In a preferred embodiment of the present invention, the frequency generator 201 is powered by a power source such as battery or DC convertor. Examples of the frequency generator 201 includes but not limited to oscillator, resonator, PWM etc.

The first electrode 103 floats in the space/air inside the container 100 and mirrors charges received from the frequency generator 201 through the conducting surface 102 and the content 101. The electronic circuitry 105 is configured to attach with the container 100 and further couples to the first electrode 103. The electronic circuitry 105 includes a convertor 12, an e-field strength meter 14, an interface 16, and a bi-directional communication unit 18.

The convertor 12 converts the alternating charges into DC energy received from the first electrode 103. Examples of the convertor 12 include but not limited to rectifier, Graetz bridge, AC-DC convertor, MOS switches etc. The e-field strength meter 14 measures the changes in the alternating charges on the container 100.

Further the e-field strength meter 14 measures the changes in the alternating charges on the content 101 inside the container 100. Examples of the e-filed strength meter 14 includes but not limited to VCO, ADC, charge controlled pulser, R/C circuits, electroscope, impedance meters etc.

The e-field strength meter 14 measures the change in the field strength in real time for detecting decay or contamination 602 on the content 101 of the container 100. Further, the e-field strength meter 14 measures the change in the field strength in real time caused due to infestation 600 in the content 101 of the container 100. Further in another preferred embodiment of the present invention, the e-field strength meter 14 is able to identify the particles or ingredients 601 in the content 101 of the container 100 when they are separated by gravity or density.

The interface 16 generates input and output signals on receiving the change in the alternating charges from e-field strength meter 14. In another preferred embodiment of the present invention, the interface 16 controls the operation of one or more peripheral devices. Examples of the interface 16 include but not limited to IO Ports, electronic switches, opto couplers etc. Examples of peripheral devices include but not limited to sensors, (RGB, IR, UV) LEDs, flashers, Displays, buzzers, music chips.

The bi-directional communication unit 18 communicates the changes in the electric field strength from the e-field strength meter 14 to the controller 200. The bi-directional communication unit 18 communicates over the e-field with the controller 200. Examples of the bi-directional communication unit 18 includes but not limited to AM or FM (de) modulators, modem sub-circuits, peak detectors, side-band modulators etc.

The second electrode 104 is coupled to the convertor 12. Further the second electrode 104 is attached to the cap of the container 100 and floats against the ground. The controller 200 transmits a signal to the media unit 301 over the communication network 300 on receiving field strength signal from the bi-directional communication unit 18.

In another preferred embodiment of the present invention, the system 10 further includes a movable camera 304 for receiving signal from the media unit 301 through the communication network for capturing images of the user 400 causing changes in the field strength near the container 100. In a preferred embodiment of the present invention, the moveable camera 304 is moveable in all directions i.e. X, Y and Z.

For exemplary purposes, the movable camera 304 detects or monitors the presence of the user 400 near the container, and then the movable camera 304 captures the images/footage of the user 400. The user 400 is able to view interaction with the container 100 captured with the movable camera 304 on a communication device 20.

In a preferred embodiment of the present invention, the communication device 20 receives information via email, video messages, prints etc from the media unit 301. Further, the movable camera 304 helps to identify or prevent the shoplifters stealing the container 100. The moveable camera 304 is activated only on the presence of user 400 near to the container 100. The present system 10 thus saves on the power consumption.

Further in another preferred embodiment of the present invention, the system 10 further includes a light source 106 for illuminating the content 101 and/or parts of the container 100 on receiving signals from the I/O interface 16. The light source 106 is attached to the electronic circuitry 105. For example, the light source 106 hangs inside the container 100 from the electronic circuitry 105, or is an illuminated trace etc.

Further in another preferred embodiment of the present invention, the system 10 further comprising a sealed switch 107 for activating on the removal of the cap 106 from the container 100 and communicates the status to the bi-directional communication unit 18. Examples of the sealed switch 107 includes but not limited to conductive printing on a label, any kind of ripcord, mechanical or magnet switches, etc.

Further in another preferred embodiment of the present invention, the system 10 further comprising a display unit 302 receives signal from the media unit 301 through the communication network 300 for displaying media data to the user 400. Further the media unit 301 receives the e-field strength signal from the controller 200. Examples of the display unit 302 include but limited to LCD, LED, projectors, laser etc.

The controller 200 sends signal to the display unit 302 only on receiving the change in the electric field from the bi-directional communication unit 18. Thus, the display unit 302 is activated to display the media data only when the user 400 approaches the container 100.

Thus, the display unit 302 displays media data related to the container 100 which is approached by the user 400. The media data related to the container 100 includes but not limited to contents of the container 100, video and audio advertisements of the container 100, images of the container 100, applications of the container 100 etc.

In another preferred embodiment of the present invention, the system 10 includes a first capacitor 203 for filtering the generated alternating charges, a second capacitor 204 for forking in or out modulation in the generated alternating charges, and impedance 202 for creating a resonance filter with the first capacitor 203 and the second capacitor 204.

The controller 200 communicates data to the bi-directional communication unit 18 through the fork between the first capacitor 203 and the second capacitor 204.

In another preferred embodiment of the present invention, the system 10 includes a movable light 303 for projecting light on the container 100 on receiving signal from the media unit 301. The contoller 200 receives the signal from the bi-directional communication unit 18 and thus commands the media unit 301 to further command the moveable light 303 to project light towards the container 100 approached by the user 400.

The movable light 303 is able to move in all possible direction i.e. X, Y and Z directions. The moveable light 303 is able to project light (either a colored, UV, IR) in the direction of container 100 approached by the user 400. In another preferred embodiment of the present invention, the container 100 may reflects the light (reflective zones, fluorescent symbols, etc.).

In another preferred embodiment of the present invention, the media unit 301 further communicates media data or information related to the container 100 to a communication device 20 of the user through the communication network 300. The communication device 20 may be carried by the user 400 or e.g. is attached to a shopping cart, basket etc.

Further in another preferred embodiment of the present invention, the system 10 includes the cloud server 300 to store (media) information about the container 100 and the user data. The cloud server 300 communicates data to the communication device 20 of the user 400 and the media unit 301.

In another preferred embodiment of the present invention, the system 10 further includes an identification device 401 carried by the user 400. The identification device 401 modulates a user ID over the second electrode 104 into the bi-directional communication unit 18.

The controller 200 processes the user ID received from the bi-directional communication unit 18 to identify the user 400. Examples of the identification device 401 include but not limited to a smartphone, batches, tags attached to the user etc. The system 10 identifies the tag and is then able to share personalized media content or information related to the container 100.

In an exemplary embodiment of the present invention, the plurality of electronic circuitry may be placed in a retail space, e.g. on a shelf. At least one electronic circuitry is attached on at least one container. The electronic circuitry communicates with the media unit on identifying the change in the electric field at the container. Thus, the user is able to view information related to the container and its content on the display unit connected to the media unit via the communication network.

Further in another exemplary embodiment of the present invention, when multiple users approach several containers in a retail space. The media unit then may either serves one command at a time received from the electronic circuitry. Further, many display units, movable cameras and movable light sources may be attached to several media units. Each display unit may relay commands from the media unit in order of receiving from the electronic circuitry. The media units may further send container related information to the communication device of respective approaching user.

The present invention offer various advantages such as keeping the consumers focused on the container while creating a distance to copyists and discounter products as well at the same time. The present invention also supports inventory and prevents against shoplifting, and further, provides the users amazing experience of dynamic pricing and personalized shopping without queuing on cash registers.

Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

The invention claimed is:

1. A system for interacting with one or more containers placed near a conducting surface, further the system sends the information of content inside the container in relation to an action caused by a user over the communication network, the system comprising:
   a controller for generating a unique identification code for each container, wherein the controller communicates through the communication network;
   a frequency generator for providing a modulated alternating electric field with variable frequency;
   a first electrode floats in the air inside the container and mirrors charges received from the frequency generator through the conducting surface and the content;
   plurality of electronic circuitries, wherein at least one electronic circuitry configured to attach with one of the one or more containers and further couples to the first electrode, said electronic circuitry comprising:
      a convertor for converting alternating charges into DC energy received from the first electrode;
      an e-field strength meter to measure the changes in the alternating charges on the container;
      an I/O interface to generate input and output signals on receiving the change in the alternating charges from e-field strength meter; and
      a bi-directional communication unit to communicate the changes in the electric field strength from the e-field strength meter to the controller;
      a second electrode coupled to the convertor, further the second electrode attached to the cap of the container and floats against ground;
   a media unit for storing and communicating media data related to the container over the communication network on receiving a field strength signal along with the unique ID number from the controller; and
   wherein further the controller transmits the field strength signal to the media unit over the communication network on receiving field strength signal from the bi-directional communication unit.

2. The system according to claim 1 further comprising a movable camera receives signal from the media unit through the communication network for capturing images of the user causing changes in field strength near the container.

3. The system according to claim 1 further comprising a light source connected to attach with the electronic circuitry of the container for illuminating the contents and the container on receiving signals from the I/O interface.

4. The system according to claim 1 further comprising a sealed switch activated on the removal of the cap from the container and communicates the status to the bi-directional communication unit.

5. The system according to claim 1 further comprising a display unit for receiving signal from the media unit through the communication network for displaying media data to the user, wherein the media unit receives the e-field strength signal from the controller.

6. The system according to claim 1 further comprising:
   a first capacitor for filtering the generated alternating charges;
   a second capacitor for forking out modulation in the generated alternating charges;
   an impedance for creating a resonance filter with the first capacitor and the second capacitor;
   wherein the controller communicates data to the bi-directional communication unit through the fork between the first capacitor and the second capacitor.

7. The system according to claim 1 wherein the e-field strength meter measures changes in the field strength in real time caused due to the infestation in the content of the container.

8. The system according to claim 1 wherein the e-field strength meter measures changes in the field strength in real time on identifying contamination in the content of the container.

9. The system according to claim 1 further comprising a movable light projects light on the container on receiving signal from the media unit, wherein the media unit receives signal from the controller.

10. The system according to claim 1 wherein the media unit communicates media data related to the container to a communication device of the user through the communication network.

11. The system according to claim 10 wherein the system comprising a cloud server to store media information about the container and the user data, wherein cloud server communicates data to the communication device of the user and the media unit.

12. The system according to claim 1 further comprising an identification device carried by the user, wherein the identification device modulates a user ID over the second electrode into the bi-directional communication unit, wherein the controller processes the user ID received from the bi-directional communication unit to identify the user.

* * * * *